United States Patent Office — 3,351,704 — Patented Nov. 7, 1967

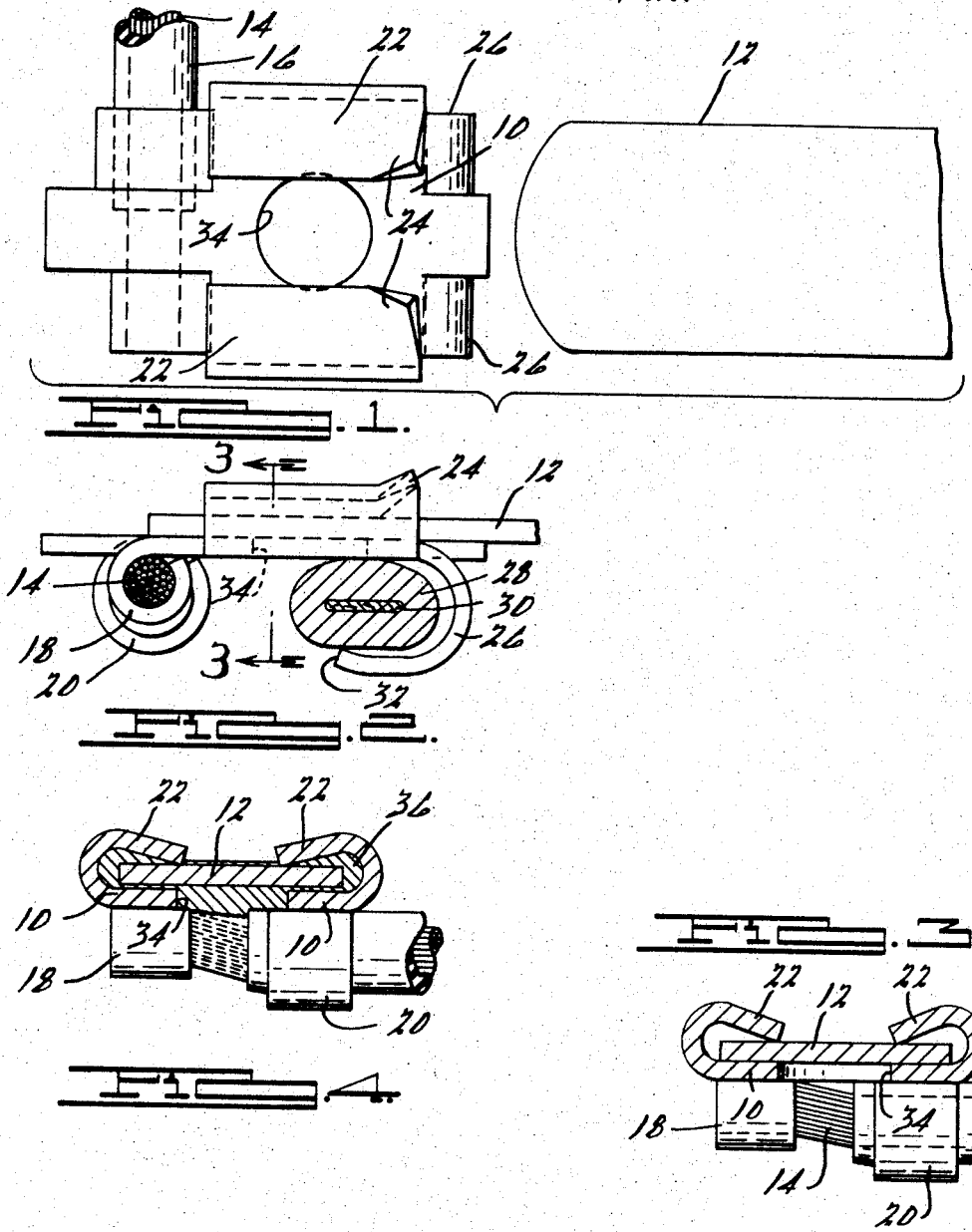

3,351,704
SOLDERING AID TERMINAL
Fred C. Sitzler, Mechanicsburg, Pa., assignor to Berg Electronics, Inc., New Cumberland, Pa., a corporation of Pennsylvania
Filed Mar. 18, 1965, Ser. No. 440,679
8 Claims. (Cl. 174—84)

ABSTRACT OF THE DISCLOSURE

The terminal includes a socket for receiving the blade conductor, a mass of solder secured to the terminal on a side thereof away from the socket, a solder flow opening through the terminal communicating the side of the terminal on which the solder is secured with the socket and a wire grip ferrule for crimping a wire to the terminal. The terminal is heated so that the solder mass melts and flows into the ferrule and through the solder flow opening and into the socket whereby a reliable solder joint is formed between the terminal, the blade conductor, and the wire.

---

This invention relates to soldering aid terminals and particularly to a flag type terminal which has a wire conductor crimped thereto and which carries an integral source of solder. The terminal may be mechanically secured to a blade type contact and then heated so that the mass of solder melts and flows by capillary action over the surfaces of the terminal and through a solder flow opening so as to make a positive electrical connection between the conductor contact blade and the terminal.

My invention represents a marked improvement over conventional soldering aid terminals. Such terminals are predipped in solder so as to provide a heavy layer of solder over the surfaces of the terminal. This solder layer prevents the terminal and the blade or wire which may be held in the conventional terminal from being held in intimate metal-to-metal contact with the terminal prior to remelting of the solder and forming of the electrical connection. The resulting connection has a thicker layer of solder between the two conductors than in the case of my invention and is inferior to the connection achieved with my terminal.

Accordingly, a primary objective of my invention is to provide an improved soldering aid terminal.

Another objective is to provide a soldering aid terminal with a supply of solder secured thereto which, when heated, flows by capillary action to form a desirable connection between an electrical conductor and a contact blade held by the terminal.

A further object is to provide a soldering aid terminal formed from strip metal stock with a source of solder secured thereto and with a solder flow opening therein so that when the terminal is heated, the solder will melt and flow along the surfaces of the terminal and through the opening to make a desirable electrical connection with electrical conductors secured to either side of the terminal.

Other and further objects of the invention will be apparent from the following description and claims and may be understood by reference to the accompanying drawings which by way of illustration show a preferred embodiment of the invention and what I now consider to be the best mode of applying the principles thereof. Other embodiments of the invention may be used without departing from the scope of the present invention as set forth in the appended claims.

In the drawings:

FIGURE 1 is an enlarged plan view, looking down on my soldering aid terminal and showing it in position to be inserted on a conductor blade;

FIGURE 2 is a side view of the terminal shown in FIGURE 1;

FIGURE 3 is a sectional view taken along section line 3—3 of FIGURE 2; and

FIGURE 4 is a view similar to FIGURE 3 but taken after the solder connection has been formed.

As shown in the drawings, my terminal is formed from thin sheet metal stock and is provided with a flat body portion 10. The terminal may be inserted upon a flat blade contact 12 and is held in intimate contact with the blade by the two ears 22 which are formed from the sheet metal stock and are bent over against one side of the body 10 so as to provide a channel to guide the insertion of the terminal over the blade 12. The leading edges 24 of the ears 22 are bent upwardly to provide a lead-in so that the terminal may be easily inserted over the blade 12. As shown in FIGURE 3, the ears hold the blade 12 in positive metal-to-metal contact with one side of the flat body 10 of the terminal.

The other side of my terminal is provided with a wire gripping ear 18 and an insulation gripping ear 20 which, as shown in FIGURES 2 and 3, are wrapped around the bared end of wire 14 and the wire insulation 16 respectively. The wire gripping ear 18 forms a positive metal-to-metal contact between the terminal and the wire 14.

The terminal is provided with two solder-retaining tabs 26 which hold a mass of solder 28 against the under side of the flat body 10 of the terminal. The tips 32 of the tabs 26 are bent inwardly so that they hold the solder in intimate contact with the terminal. As shown in FIGURE 2, such mass of solder may be a section of ordinary resin core solder of the type used in making electrical connections. It is preferable that such a length of solder be provided with a source of resin or flux 30 so as to facilitate the flow of the melted solder along the terminal and to improve the solder connection.

The flat body 10 of the terminal is provided with a solder flow opening 34 in the middle thereof. This opening serves to permit the hot solder to flow from the side of the terminal against which the solder mass 28 is secured to the other side of the terminal upon which the blade 12 is held so that a positive solder connection is formed between the blade 12 and the terminal.

After the terminal has been mechanically inserted on the blade 12 the terminal is positioned as shown in FIGURE 2. The terminal is then heated to melt the solder 28. The melted solder flows by capillary action over the surfaces of the terminal so as to fill the space between the ear 18 and the wire 14. The hot solder flows exceedingly easily so that capillary action draws the solder through the solder flow hole 34 and along the contact surface between the blade 12 and the flat surface of the body 10 of the terminal to fill the spaces 36 between the ears 22 and the blade 12 as shown in FIGURE 4.

In order to facilitate the flow of the hot solder along the surfaces of the terminal, I have found that it is preferable to precoat the metal strip from which the terminal is formed with a thin smooth layer of solder. This layer acts as a carrier for the melted solder and facilitates the flow of the solder along the terminal. The solder flow opening 34 is punched from the metal stock after the stock is provided with the thin solder coating. I have found that in the punching of the opening 34 the solder coating on the metal stock is dragged down across the interior surface of the opening 34 so that this surface is provided with a solder coat to facilitate the flow of the melted solder across the opening when the terminal is heated.

In some situations it is desirable to provide my terminal with a source of solder in which the resin carried in the solder source is in direct contact with the surface of the terminal so that when the terminal is heated and the resin melts it immediately flows over the surfaces of the terminal to facilitate the flow of the main mass of the solder over the terminal and to improve the solder connections formed. In such situations I position a slice of flux core solder between the terminal and tabs 26 with one end face in contact with the flat surface of the terminal body 10. I have found that this arrangement with the flux core in contact with the terminal achieves the desired improved results.

I claim:

1. A soldering aid terminal comprising a flat body of thin sheet metal including first means on one side of said body for receiving and biasing an electric conductor against and into intimate contact with said one side of said body, second means for holding a second conductor in intimate surface to surface contact with said body, an integral mass of solder, means for holding said mass in contact with the other side of said body, and a solder flow opening through the thickness of said body connecting said sides of the body whereby upon heating the terminal said solder melts and flows by capillary action along the surface of the terminal and through the opening to said first means and flows to said second means so as to form a positive solder connection between the terminal and the two electric conductors.

2. A soldering aid terminal as described in claim 1 where said sheet metal has a thin solder coating to aid the flow of molten solder along the terminal surface.

3. A soldering aid terminal as in claim 1 wherein said first means comprises a socket for receiving a blade type conductor and includes a wall, and means for holding such conductor against the wall, said opening being formed through said wall and communicating the interior of the socket with the other side of the body.

4. A soldering aid terminal as in claim 1 wherein said second means is located on the other side of said body and the solder flow opening is located between said second means and said solder mass holding means.

5. A soldering aid terminal comprising a flat body of thin sheet metal formed to provide a socket for receiving and mechanically holding a connector to said body and to provide a protruding ear for engaging and mechanically holding a wire to said body, said socket and ear being located on opposite sides of said body; a solder flow opening through the body communicating said sides thereof, and an integral mass of solder secured to one side of said body whereby upon heating of said body said solder melts and flows along the surfaces of said body, through said opening, and around said connector and wire so as to form a positive electric solder connection therebetween.

6. A soldering aid terminal comprising a body of sheet metal and including a socket for a blade type conductor, said socket including a generally rectilinear base and holding means at opposed edges of the base for holding the conductor against one side of the base, crimp means for securing a wire to the other side of the base, an integral mass of solder, solder holding means for holding said mass of solder in contact with the other side of the base, and a solder flow opening in the center of the base communicating the interior of the socket with the other side of the base.

7. A soldering aid terminal as in claim 6 wherein said crimp means and said solder holding means are on the other opposed edges of the base.

8. A soldering aid terminal as in claim 6 wherein said holding means comprise reverse bend ears with the free edges thereof extending toward the one side of the base, said ears including lead-in portions to facilitate insertion of the blade type conductor into the socket.

References Cited
UNITED STATES PATENTS

| | | | |
|---|---|---|---|
| 2,504,512 | 4/1950 | Esslie | 228—56 |
| 2,664,844 | 5/1954 | Siegrist et al. | |
| 2,759,161 | 8/1956 | Berg | 339—276 X |
| 3,123,431 | 3/1964 | Keller. | |
| 3,247,315 | 4/1966 | Miller | 174—84 |

FOREIGN PATENTS

| | | |
|---|---|---|
| 132,599 | 9/1919 | Great Britain. |
| 815,581 | 7/1959 | Great Britain. |

DARRELL L. CLAY, *Primary Examiner.*